United States Patent [19]
Nyce et al.

[11] Patent Number: 5,848,549
[45] Date of Patent: Dec. 15, 1998

[54] MAGNETOSTRICTIVE POSITION SENSING PROBE WITH WAVEGUIDE REFERENCED TO TIP FOR DETERMINING FLUID LEVEL IN A CONTAINER

[76] Inventors: David S. Nyce, 2633 Whistling Quail Run, Apex, N.C. 27502; Mauro G. Togneri, 100 Warley Cir., Cary, N.C. 27513; Richard S. Bulkowski, 4317 Omni Pl., Raleigh, N.C. 27613

[21] Appl. No.: 564,863

[22] Filed: Nov. 30, 1995

[51] Int. Cl.⁶ .................................................. G01F 23/56

[52] U.S. Cl. .................. 73/319; 73/311; 73/313; 73/314; 324/207.13

[58] Field of Search ................... 73/290 V, 311, 73/313, 314, 319, 321; 324/207.13, 207.22, 207.24; 333/148

[56] References Cited

U.S. PATENT DOCUMENTS

| | | | |
|---|---|---|---|
| 4,939,457 | 7/1990 | Tellerman | 73/314 X |
| 5,050,430 | 9/1991 | Begin et al. | 374/142 X |
| 5,545,984 | 8/1996 | Gloden et al. | 73/314 X |

*Primary Examiner*—George M. Dombroske
*Assistant Examiner*—Joseph L. Felber
*Attorney, Agent, or Firm*—David M. Ostfeld

[57] ABSTRACT

A magnetostrictive position sensing device is disclosed where a probe assembly surrounding a waveguide is anchored at one end to the bottom of a tank and terminates in a transducer assembly attached to the top of the tank. The probe assembly compensates for differential coupling between two sections of the probe assembly. The sensing device also includes one or more fluid level floats movably surrounding a portion of the probe.

17 Claims, 6 Drawing Sheets

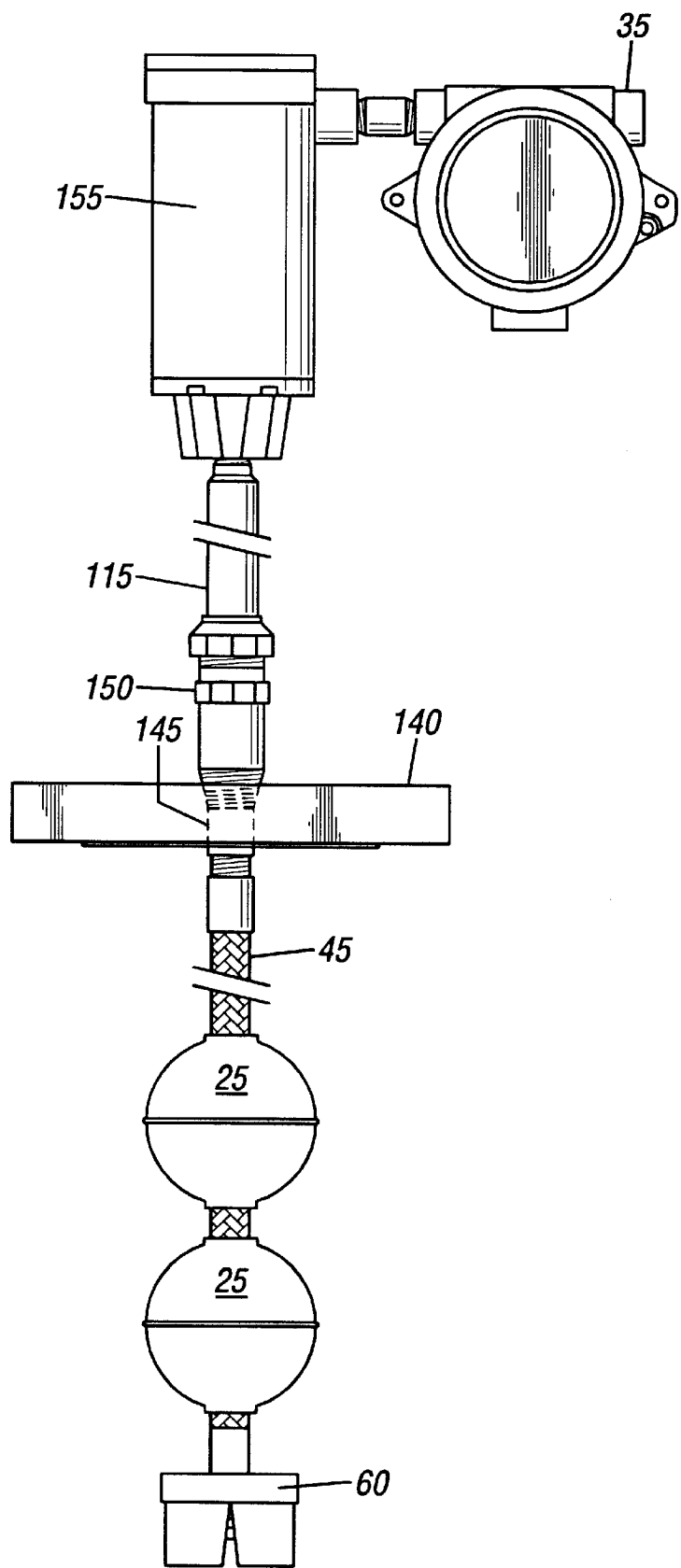

FIG. 5

| REFERENCE NUMBER | DESCRIPTION |
| --- | --- |
| 5 | WAVEGUIDE |
| 6 | RETURN WIRE |
| 10 | TRANSDUCER ASSEMBLY |
| 15 | HOUSING OR PROBE |
| 20 | INSULATING TUBING |
| 21 | TEFLON COATING |
| 25 | PRODUCT AND INTERFACE FLOATS |
| 30 | WIRE ASSEMBLY |
| 35 | CUSTOMER'S WIRING TERMINATION HOUSING |
| 37 | LIQUID LEVEL |
| 38 | FLUID |
| 40 | TANK |
| 45 | FLEXIBLE METAL CORRUGATED OUTER TUBE (BRAID) |
| 50 | BELLOWS |
| 51 | FERRULE |
| 52 | INSULATOR |
| 55 | BALL MOUNT |
| 56 | BOLT |
| 57 | TANK BOTTOM |
| 60 | WEIGHT, MAGNET, OR GAUGE ATTACHMENT TO TANK BOTTOM |
| 65 | TUBING |
| 71 | END PLUG |
| 75 | TRANSITION TUBE |
| 85 | RETAINER |
| 86 | SPRING RETAINER |
| 87 | CONTACT, GROUND SPRING |
| 90 | COMPRESSION SPRING |
| 95 | COLLAR WITH SET SCREW |
| 96 | COLLAR WITH SET SCREW |
| 100 | TUBING ADAPTOR |
| 105 | RISER OPENING |
| 110 | RISER TANK FLANGE |
| 115 | RIGID TUBING |
| 120 | FLANGE |
| 125 | BRACKET, PROTEUS (NOT SHOWN) |
| 130 | HOUSING (METAL) |
| 140 | CUSTOMER FLANGE WITH 1" FEMALE NPT THREAD |
| 145 | OPENING IN TANK FLANGE |
| 150 | COMPRESSION FITTING |
| 155 | ELECTRONICS CAVITY | ns
MAGNETOSTRICTIVE POSITION SENSING PROBE WITH WAVEGUIDE REFERENCED TO TIP FOR DETERMINING FLUID LEVEL IN A CONTAINER

BACKGROUND OF THE INVENTION

1. Field of the Invention

The present invention relates to systems for measuring parameters with elongated waveguides in magnetostrictive displacement or distance measuring transducers, and more particularly to housings or probes for magnetostrictive transducers for measuring parameters regarding the liquid contained in a storage vessel or other container.

2. Description of the Art

Magnetostrictive transducers having elongated waveguides that carry torsional strain waves induced in the waveguide when current pulses are applied along the waveguide through a magnetic field are well known in the art. A typical linear distance measuring device using a movable magnet that interacts with the waveguide when current pulses are provided along the waveguide is shown in U.S. Pat. No. 3,898,555. The prior art also shows referencing of transducer at the head or mode converter (the converter that converts mechanical action or energy to electrical signal or electrical signal to mechanical action or energy) of the transducer, adjacent the electronics. Long magnetostrictive sensor designs of the prior art have incorporated a "dead space" at the tip of the probe to allow for differential thermal expansion of components of the probe. U.S. Pat. No. 3,898,555 describes a magnetostrictive position sensor, but devices of the prior art utilizing the design of U.S. Pat. No, 3,898,555 have the sensor element spring loaded at the bottom to allow for differential thermal expansion. This again imposes a "dead space" over which reliable readings cannot be made.

For general background information, see "Ultrasonic Level, Temperature and Density Sensor" by S. C. Rogers and G. N. Miller, IEEE Transactions on Nuclear Science, Vol. NS-29, No. 1, February 1982.

It is an object of the present invention to produce a magnetostrictive position sensor probe that references the waveguide from the tip of the probe instead of near the mode converter.

It is a further object of the present invention to produce a magnetostrictive position sensor probe for level measurements with the magnetostrictive sensing element connected at the bottom of the probe and referenced to the bottom or other reference point of the vessel into which the probe is installed.

SUMMARY OF THE INVENTION

The present invention relates to a rugged magnetostrictive position sensing probe with the waveguide referenced to the tip used for measuring parameters regarding the liquid contained in a storage vessel or other container. The use of a waveguide referenced to the tip is especially useful for more accurate liquid level measurements. The magnetostrictive sensing element is connected at the bottom of the probe and referenced to the bottom, or other reference point to which it may be connected, of the vessel into which the probe is installed. Distance measurements may be made to a float at the liquid surface and, as an option, float(s) at liquid interface(s), such as between the product in the vessel and the water level at the bottom of the vessel. The implementation of the anchoring of the tip may be with any magnetostrictive position sensing device known in the prior art or yet to be determined. Thus no particular magnetostrictive position device will be described, but only depicted generally in the descriptions of the invention below.

The housing or probe may be made of one or several materials which have different thermal expansion rates from the waveguide that is required for all magnetostrictive sensing devices and other housing materials. In the past, long magnetostrictive sensor designs have incorporated a "dead space" at the tip of the probe to allow for differential thermal expansion of components of the probe. However, in the present invention, the housing or probe for the magnetostrictive device anchors and references the magnetostrictive position sensing device, as more fully described below. Thus, in the present invention, "dead space" is eliminated by connecting the waveguide directly or indirectly to the housing material at the bottom of the probe. Differential expansion is accommodated by a spring-loading or other compensation mechanism at the head of the device to allow the mode convertor of the sensor element to float with respect to the housing materials.

The device has a flexible outer housing for magnetostrictive tank gauging, permitting ease of transport of very long devices. It is also prefabricated for watertight housings and requires no assembly or incorporation of the magnetostrictive sensing element in the assembly at the site except to affix the float, as is well known in the art. Thus, the possibility for leakage is diminished.

DESCRIPTION OF THE DRAWINGS

For a further understanding of the nature and objects of the present invention, reference should be had to the following figures in which like parts are given like reference numerals and wherein:

FIG. 2 is an illustrative view of the sensing device of the preferred embodiment of the present invention showing multiple floats for level and interface measurements.

FIG. 5 is a description of the various reference numbers that are associated with the parts of the invention.

DETAILED DESCRIPTION OF THE PREFERRED EMBODIMENT

Figure 1A:
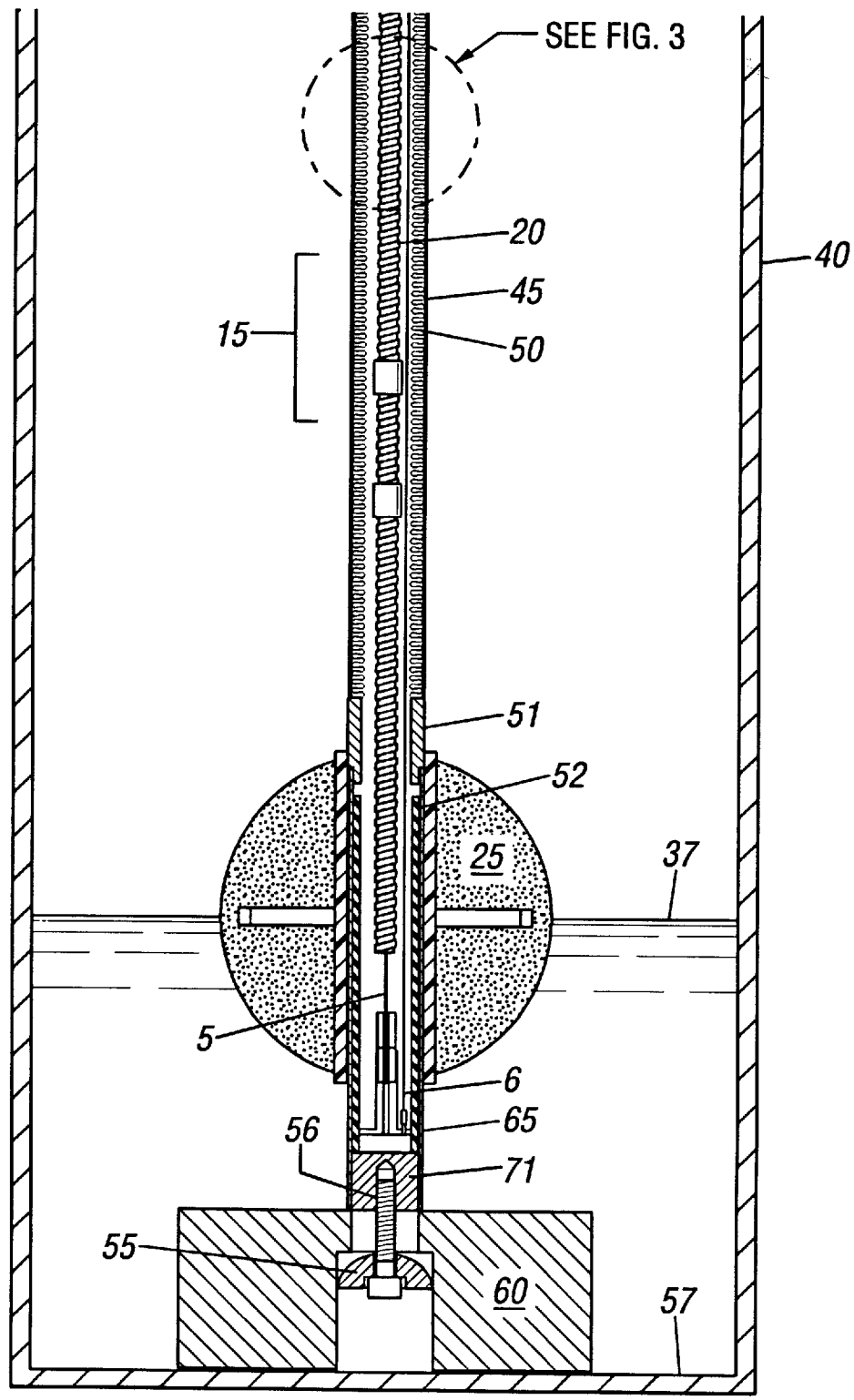
FIG. 1A is a side, partial cross-sectional, partial cut away view of the bottom part of the complete sensing device of the preferred embodiment of the present invention.
Figure 1B:
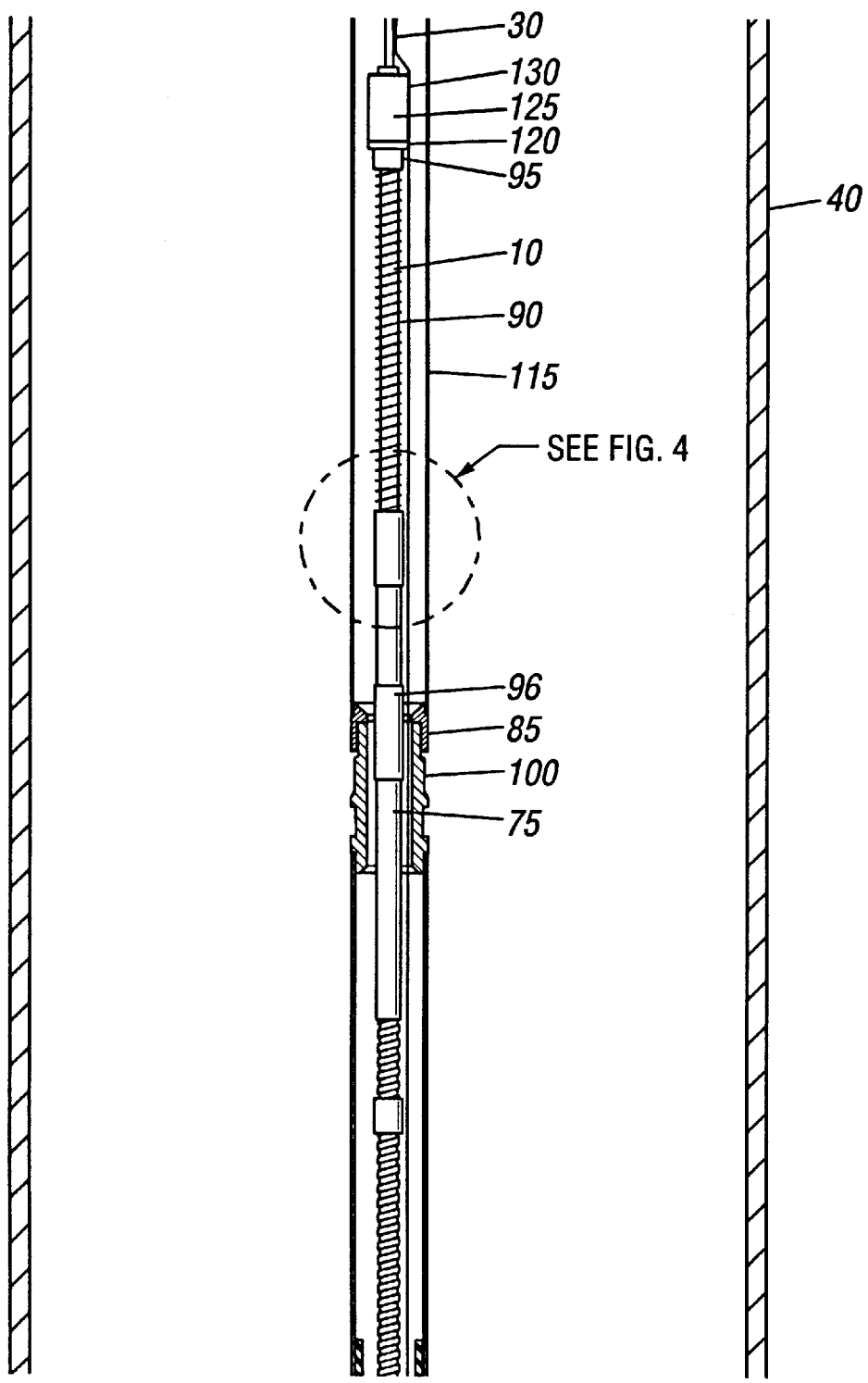
FIG. 1B is a side, partial cross-sectional view of the middle part of the complete sensing device of the preferred embodiment of the present invention.
Figure 1C:
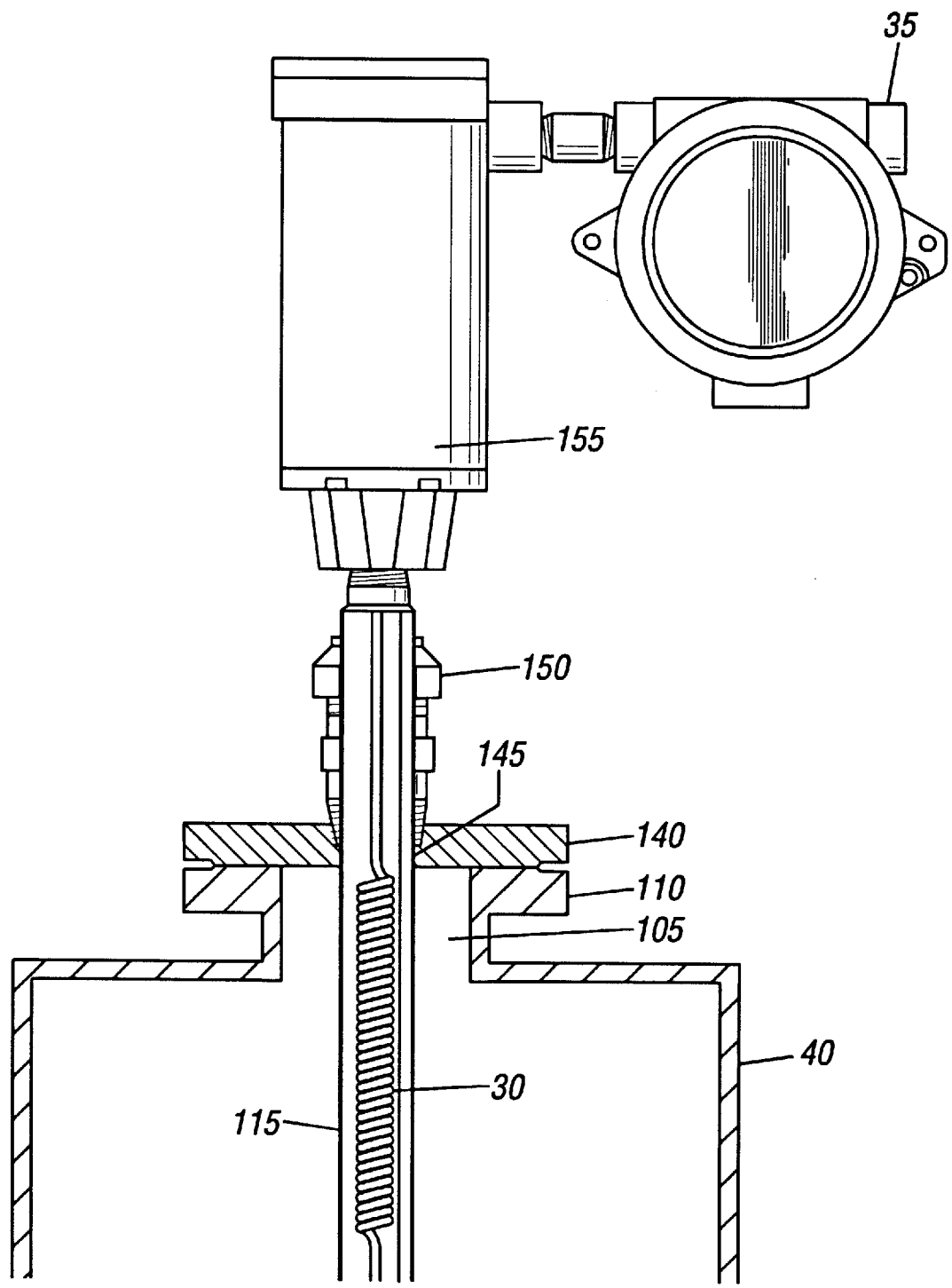
FIG. 1C is a side, partial cross-sectional view of the top part of the complete sensing device of the preferred embodiment of the present invention.
Figure 3:
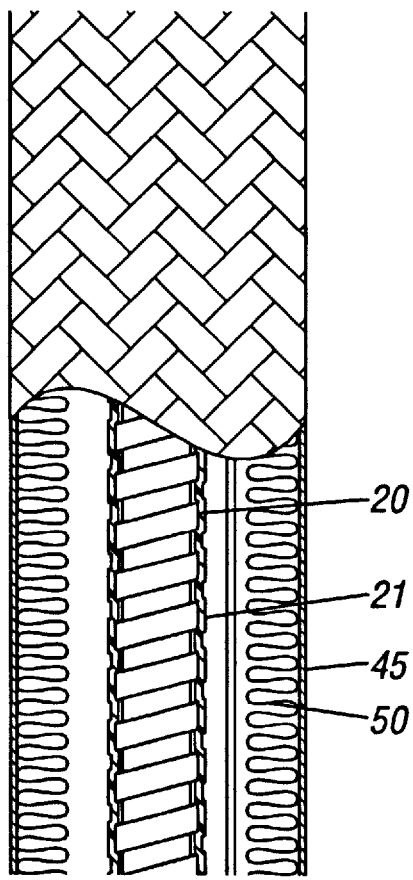
FIG. 3 is a detail of FIG. 1A.
Figure 4:
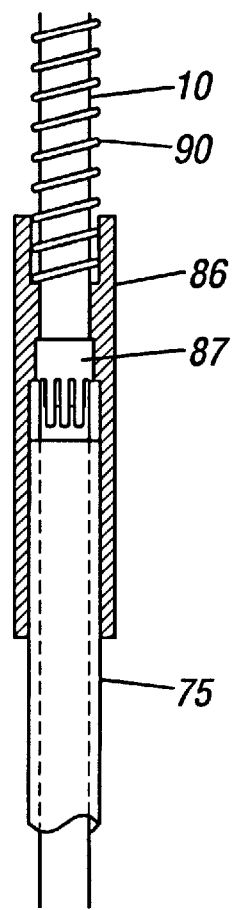
FIG. 4 is a detail of FIG. 1B.

A probe or housing 15 of the present invention is shown in FIGS. 1A, 1B and 1C to be located in a tank 40. Probe 15 includes a transducer or sensing element assembly 10, which may be any transducer, including those of the prior art such as that shown in U.S. Pat. No. 3,898,555 or any other transducer presently on the market or may be introduced in the future. Transducer 10 may be used for measuring displacements and/or distances or other measurements, and the housing or probe 15 of the present invention will be applicable to any of them. The general type of transducer 10 should not be deemed as limiting the disclosure of the housing or probe 15, and the disclosure of the probe 15 should not be deemed to be limited by the disclosure for the waveguide construction and should not be deemed to be limited by the mode converter or other electronics. Further, the general nature of the transducer as electrically producing only the return pulse and interfacing on that basis with any electronics of a buyer or user of the device should not be deemed to be limiting the disclosure of the probe or housing 15. A typical magnetostrictive transducer 10 that could be used with the preferred embodiment of the housing or probe 15 of the present invention is disclosed in U.S. Pat. No. 5,590,091, entitled "Waveguide Suspension Device and Modular Construction for Sonic Waveguides", filed by applicants Michael L. Gloden and Arnold Fred Sprecher, Jr., incorporated herein by reference.

The transducer 10 includes an elongated waveguide assembly enclosed in an insulating tubing 20. Insulating tubing 20 helps to maintain the shape of the inner member (not shown) which is typically a woven tube to act as a cushion for the waveguides, and be made of a fine, hard material, or combination of materials, such as ceramic or glass with a strand count and weave configuration to act as a cushion for the waveguide 5. Tubing 20 also protects the inner member from the outer flexible metal corrugated outer braid 45. Tubing 20 is enclosed by a polymer or other flexible coating 21 and is provided this way by the supplier. The coating 21 acts as an insulator for shielding purposes.

Insulating tubing 20 which surrounds the waveguide 5 is enclosed by coaxial flexible metal corrugated outer braid 45 with a bellows 50 therebetween. The inner sleeve or insulating tubing 20 acts as a cushion between the waveguide 5 and the flexible metal corrugated outer braid 45. The bellows 50 helps in the sealing and to maintain the shape of the insulating tubing 20, and to protect tubing 20 from abrasion by the flexible, metal corrugated outer braid 45.

The waveguide assembly in the insulating tube 20 including an elongated interior waveguide 5, the return wire 6 also being coaxial with tubing 20. A current is passed through the waveguide 5 and returns through a return wire 6 electrically connected to the waveguide 5. Typically, at least one magnet located in a product or interface float 25 is mounted over the waveguide assembly and insulating tubing 20 by having an opening formed in the middle of the float 25, the opening being placed over and coaxial with outer braid 45. The magnet interacts with the current pulse as more completely described in U.S. Pat. No. 3,898,555. As shown in FIG. 2, it is known in the art to detect the position of magnets in multiple floats 25. Upon the strain wave pulse returning to the source of the current (not shown) after passing through the waveguide 5 and return wire 6, a suitable mode converter (not shown) of any type known or to be known in the art provides an electrical signal through conductors 30 to any electronic circuit connected to it, such as through a customer wire termination housing 35. An inert gas may be introduced in bellows 50 to further promote isolation and sealing. An end plug 71 acts to stop fluid 38 from the bottom 57 of the tank 40 in which it is installed from entering bellows 50. Outer tube 45 and bellows 50 form a liquid tight seal to prevent fluid leakage to guide 5. Outer tube 45 is used to protect bellows 50 which normally is the fluid tight seal. Plastic or other materials impervious to liquids to provide such a seal could also be used.

The end plug 71 of the waveguide assembly is normally at the end of the waveguide assembly which would be near the bottom 57 of tank 40, if transducer 10 is being used for determining the level of liquid 37 in tank 40. As discussed in the Background, it is desired to make the dead zone, or non-signal producing zone, adjacent to the end plug 71 as short as possible.

As shown in FIG. 1A, the bottom portion of probe 15 includes a ball mount 55 being secured by bolt 56 for attachment of a weight, magnet or gauge attachment 60. Brackets (not shown) may be attached by welding or other suitable method on the bottom 57 of tank 40 while the tank 40 is not in service. A weight or gauge attachment 60, or alternatively a magnet, are used to hold the bottom of probe 15 on the bottom 57 of tank 40. Alternatively, with the magnet, if the material of tank 40 is also magnetic material, for example ferromagnetic material, it may not be necessary to weld a bracket or otherwise attach the weight 60 to the bottom 57 of tank 40. Magnetic forces may then hold weight 60 in place. Thus, the bottom of probe 15 is maintained in contact and in fixed position with the bottom or reference 57 of the vessel 40 for accurate reading, rather than the top of the vessel 40. Thus, by this construction, the measurements may be referenced to the bottom of vessel 40 instead of the top of vessel 40. This connection avoids the problem of probes of the prior art which were typically referenced to the top of the vessel 40, where changes in the vessel forces can change the dimensions of the vessel 40, yielding inaccurate level measurements. Accordingly, referencing readings from the bottom 57 of tank 40 provide more accurate readings of liquid level.

A ferrule 51 is welded and used to connect the bellows 50 and braid 45 to the tubing 65 and provide a leak proof seal. An insulator 52 is used to isolate the exposed waveguides from the tubing 65. The end plug 71 is also welded to tubing 65. Thus, the bottom of the waveguide 5 is attached or otherwise referenced to the bottom of the probe 15 to make sure that the waveguide 5 remains fixed in place in reference to the bottom 57 of the vessel 40 through contact with the weight or magnet 60.

The flexible metal corrugated outer braid 45 provides a rugged, flexible outer protective cover for the probe 15. It allows complete assembly at the factory because a completed assembly can be coiled for shipment. This is because the tubing 20 is flexible with the outer braid 45 and the bellows 50. Also, the outer sheaving of the corrugated outer braid 45 is flexible and can be rolled because it is not pipe as in the prior art used in customer installations.

The insulating tubing 20 terminates at a transition tube 75 by adhesive on both sides. Tube 75 is mounted coaxially with corrugated flexible metal outer braid 45 to allow connection to the remaining components of outer braid 45. Transition or coupler tube 75 typically has a plastic retainer 85 which isolates and connects coupler tube 75 to tubing adaptor 100. Coupler tube 75 and retainer 85 are hollow in the center to permit the components interior to flexible metal corrugated braid 45, including a collar with a set screw 96 (set screw not shown), to continue through coupler tube 75, including the tube of transducer 10 which houses the waveguide 5. The retainer 85 rests on a boss in a tubing adaptor 100 and is also oblong shaped to allow measuring devices and the return wire 6 to pass by. A compression spring 90 is mounted to abut the upper end of spring retainer 86, having contact, ground spring 87, such upper end acting as a shoulder for the lower end of compression spring 90. The upper end of compression spring 90 abuts a collar 95 with a set screw (not shown) which is mounted about and fixedly attached to the outer tube of transducer 10. Compression spring 90 is also mounted about and coaxial with the outer tube of transducer 10. Thus, tube 10 reciprocates within transition tube 75. The collar 95 can be moved to adjust the spring tension on the waveguide 5. Accordingly, collar 95, spring 90, and spring retainer 86 act to allow the outer tube of transducer 10, and the elements to which it is attached as set out below to float with respect to the outer braid 45. This compensates for both differential expansion rates between the waveguide 5 and the corrugated outer braid 45 and tank 40 movements with respect to outer braid 45.

As shown in FIG. 1C, the top of the tank 40 includes an opening 105 terminating at its upper end with a flange 110. The bellows 50 and braid 45 are welded to an extension tube assembly of which tubing adaptor 100 is part. Tube 115 mates with this assembly by means of a NPT thread. Tube 115 rises upward therefrom through opening 105. Tube 115 encloses compression spring 90 and transducer 10, as well as collar 95. Further, it encloses a flange 120 covering the lower end of bracket 125 which houses transducer 10 and receives the outer tube of transducer 10, bracket 125 having a housing 130 surrounding it, typically made of metal. A wire assembly 30 is soldered to a PC board (not shown) and is mounted on bracket 125 and extends through housing 130 on the end of bracket 125 opposite to flange 120. The wire assembly 30 is a coiled cord assembly which will allow for the vertical movement of the transducer 10.

A customer flange 140 is shown sized and mounted to connect to flange 110 and opening 145 is formed in flange 140 to permit the extension of tube 115 through flange 140. Tube 115 is anchored with flange 140 by a compression fitting 150 which is connected by screwing or other means to flange 140. The upper end tube 115 is mechanically connected to an electronics cavity 155 to which is connected the customer wiring termination housing 35. In this manner, conductors 30 extend through the entire length of tube 115 and terminate (not shown) in the electrical cavity 155. The compression fitting 150 is adjustable to hold the probe 15 in place, while allowing adjustment by loosening the fitting 150, moving the probe 15 to the desired position, and then tightening the fitting 150.

The internal components of the gauge are electrically isolated or shielded from the outer tube 45 and bellows 50.

All of the features of a particular preferred embodiment of the waveguide assembly are not shown in the above disclosure in order to emphasize the generality of the disclosure.

Because many varying and different embodiments may be made within the scope of the invention concept taught herein which may involve many modifications in the embodiments herein detailed in accordance with the descriptive requirements of the law, it is to be understood that the details herein are to be interpreted as illustrative and not in a limiting sense.

What is claimed as invention is:

1. A magnetostrictive position sensing assembly for sensing one or more fluid levels in a tank, comprising:
   a. a transducer for converting an acoustic signal into an electric signal mounted on the upper end of the tank;
   b. a flexible probe including—
      i. a first section attached to said transducer;
      ii. a second section anchored to the bottom of the tank;
      iii. a first coupling, said first section and said second section reciprocally coupled to each other by said first coupling;
      iv. a waveguide assembly passing through said sections which terminates in said transducer and has a terminal at its other end in said second section; and
      v. a return wire attached to said terminal and extending up through said sections and connecting to said transducer.

2. The assembly of claim 1, wherein said flexible probe further includes a housing and said first coupling includes thermal expansion means for compensating for differential thermal expansion between said housing and said waveguide.

3. The assembly of claim 2, wherein said transducer floats with respect to said housing.

4. The assembly of claim 2, wherein said housing is flexible.

5. The assembly of claim 4, wherein said housing may be coiled.

6. The assembly of claim 4, wherein said housing is watertight.

7. The assembly of claim 6, wherein said housing is prefabricated.

8. The assembly of claim 4, wherein said housing includes corrugated metal outer braid with bellows between said braid and the interior of said housing.

9. The assembly of claim 8, wherein said bellows forms a liquid tight seal.

10. The assembly of claim 1, wherein there is further included a ball mount attached to the bottom of the tank, said second section being attached to said ball mount.

11. The assembly of claim 1, wherein there is further included an insulating tube, said insulating tube surrounding said waveguide.

12. The assembly of claim 11, wherein there is included a bolt, said bolt attaching said ball mount to said second section.

13. The assembly of claim 1, wherein said waveguide is anchored to the bottom of said probe.

14. The assembly of claim 1, wherein said probe further includes a flexible housing, said probe being coilable.

15. The assembly of claim 1, wherein said first coupling includes an upper end and a lower end, and a spring, said spring being mounted about said upper end to abut said upper end and abut said lower end.

16. The assembly of claim 1, wherein said assembly further comprises:
   c. one or more floats having a magnet therein, said floats movably surrounding a portion of said probe and floating with a fluid and/or interface level in the tank.

17. A magnetostrictive sensing assembly for sensing one or more fluid levels in a tank having a bottom, comprising:
   a. a transducer for converting an acoustic response into an electric signal;
   b. an attachment attachably engaged to the bottom of the tank including said opening leading to a cavity therein;
   c. a flexible probe having one end inserted into said opening in said attachment;
   d. means for anchoring said probe in said cavity, said means for anchoring having a ball mount and a bolt;
   e. said flexible probe including a second end attachably engaging said transducer;
   f. one or more floats having a magnet therein, said floats movably surrounding a portion of said probe and floating with a fluid and/or interface level in the tank; and
   g. an electrical cavity adjacent said transducer and said flexible probe further including—
      i. a waveguide assembly having a waveguide and a top end comprising a wire assembly for adjusting said waveguide and where said top end terminates in said transducer;
      ii. an insulating tubing surrounding a middle portion of said waveguide assembly and having an outer coating;
      iii. mean for positioning allowing said wire assembly to pass therethrough and to connect to said waveguide assembly;

iv. an outer tube surrounding said insulating tubing affixed at one end to said means for positioning;
v. a compression spring anchored at one end to said means for positioning and at said other end to a spring retainer and where said spring is coiled around said outer tube where said spring compensates for differential thermal expansion;
vi. a transition tube extending from said spring retainer and adhesively engaging an end of said insulating tubing and where said outer tube reciprocates within said transition tube and where said transition tube surrounds an upper portion of said waveguide assembly;
vii. an upper housing surrounding said outer tube terminating attachably at said electrical cavity and secured in an opening of a flange attached to the top of the tank;
viii. a middle housing surrounding said insulating tubing having a corrugated outer braid with bellows between said braid and said insulating tubing;
ix. an adaptor connecting said upper housing to said middle housing;
x. a lower housing surrounding an insulator which in turn surrounds said insulating tubing, said insulating tubing terminating its lower end inside said lower housing exposing a lower portion of said waveguide assembly;
xi. a ferrule connecting said middle housing to said lower housing and forming a fluid tight seal;
xii. an end plug attached to a lower end of said lower housing and anchored to said attachment opening by said means for anchoring and wherein said waveguide terminates in a waveguide terminal; and
xiii. a return wire attached to said terminal and extending up through said housings and connecting to said wire assembly.

* * * * *